(12) United States Patent
Huang

(10) Patent No.: US 8,074,550 B2
(45) Date of Patent: Dec. 13, 2011

(54) CUTTING MECHANISM WITH ROTATABLE BLADE

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 767 days.

(21) Appl. No.: 12/142,153

(22) Filed: Jun. 19, 2008

(65) Prior Publication Data

US 2009/0016829 A1    Jan. 15, 2009

(30) Foreign Application Priority Data

Jul. 13, 2007   (CN) .......................... 2007 1 0201074

(51) Int. Cl.
*B26F 1/02* (2006.01)

(52) U.S. Cl. .................. 83/699.11; 425/806; 83/620

(58) Field of Classification Search .............. 83/600, 83/469, 620–622, 694, 699.11, 699.31, 699.41, 83/945, 914; 407/31, 33; 144/91.2; 425/806
See application file for complete search history.

(56) References Cited

U.S. PATENT DOCUMENTS

| | | | | |
|---|---|---|---|---|
| 1,718,325 A * | 6/1929 | Weaver | .......................... | 144/234 |
| 3,593,611 A * | 7/1971 | Sagehorn | ........................ | 83/697 |
| 3,627,004 A * | 12/1971 | Ramey | .......................... | 144/34.1 |
| RE27,654 E * | 6/1973 | Chapman et al. | ............. | 144/229 |
| 3,978,746 A * | 9/1976 | Kuchuk-Yatsenko et al. | .............................. | 409/298 |
| 4,068,688 A * | 1/1978 | Benson | ........................ | 144/91.2 |
| 4,123,956 A * | 11/1978 | Harvey | .......................... | 83/620 |
| 4,384,599 A * | 5/1983 | Dagenais | ..................... | 144/34.5 |
| 4,483,226 A * | 11/1984 | Costarelli | ..................... | 83/425.3 |
| 5,146,829 A * | 9/1992 | Wadzinski | ...................... | 83/620 |
| 5,368,078 A * | 11/1994 | Rupe | ............................. | 144/234 |
| 5,771,771 A * | 6/1998 | Gagliardi, Jr. | .................. | 83/882 |
| 5,881,619 A * | 3/1999 | Fregien et al. | .................... | 83/13 |
| 5,934,842 A * | 8/1999 | Gupta | ............................ | 407/40 |
| 6,799,358 B2 * | 10/2004 | Satran | .......................... | 29/426.1 |
| 2009/0123239 A1* | 5/2009 | Huang | ........................... | 407/33 |

* cited by examiner

*Primary Examiner* — Boyer D Ashley
*Assistant Examiner* — Sara Addisu
(74) *Attorney, Agent, or Firm* — Altis Law Group, Inc.

(57) ABSTRACT

A cutting mechanism includes a first main body and a second main body. The first main body includes a first base, a plurality of first cutter holders, and a plurality of first cutters. The first cutters are mounted on the respective first cutter holders. The first cutter holders are movably engaged with the first base in a manner that the first cutters mounted thereon are adjustably movable toward and away from the first base. The first cutters are rotatable relative to the respective first cutter holders about parallel first axes, and each of the first cutters has a first blade substantially parallel to the respective first axis. The second main body has a similar configuration as the first main body.

7 Claims, 6 Drawing Sheets

CUTTING MECHANISM WITH ROTATABLE BLADE

BACKGROUND

1. Technical Field

The present invention generally relates to cutting mechanisms and, particularly, to a cutting mechanism for cutting elements formed by injection molding.

2. Discussion of Related Art

Injection molding is a process that injecting melted modeling material into molds to mold elements having predetermined shapes. Injection molding is widely used in ceramic and polymer products as having advantages of low cost, high efficiency, and high precision.

Generally, the semi-manufactured products formed by injection molding usually have different structures due to molds with different runners, for example, correctitude runners or side runners. Referring to FIG. 5, a semi-manufactured product 20 molded by molds having correctitude runners includes a sprue portion 200, a plurality of runner portions 202 and a plurality of lenses 204 respectively connected to the plurality of runner portions 202. The runner portions 202 are connected to the sprue portion 200 and form a radial-distribution around the sprue portion 200. Each of the lenses 204 is correspondingly formed at a distal end of the runner portions 202 and on an axial direction extending from the center axis AA' of the runner portions 202. Referring to FIG. 6, a semi-manufactured product 30 molded by molds having side runners similarly includes a sprue portion 300, a plurality of runner portions 302 and lenses 304. The difference between the semi-manufactured product 30 and the semi-manufactured product 20 is that, each of the lenses 304 is formed on a side of a direction extending from the center axis BB' of the runner portions 302. Due to different structure relationship between the lenses and runner portions, different cutting blades are needed in cutting process. Accordingly, a corresponding cutting mechanism is needed in the cutting process.

Therefore, what is needed is a new cutting mechanism in order to overcome the above described shortcomings.

SUMMARY

A cutting mechanism, in accordance with a present embodiment, is provided. The cutting mechanism includes a first main body and a second main body. The first main body includes a first base, a plurality of first cutter holders and a plurality of first cutters. The first cutters are mounted on the respective first cutter holders. The first cutter holders are movably engaged with the first base in a manner that the first cutters mounted thereon are adjustably movable toward and away from the first base. The first cutters are rotatable relative to the respective first cutter holders about parallel first axes, and each of the first cutters has a first blade substantially parallel to the respective first axis. The second main body includes a second base, a plurality of second cutter holders and a plurality of second cutters. The second cutter holders are movably engaged with the second base in a manner that the second cutters mounted thereon are adjustably movable toward and away from the second base. The second cutters are rotatable relative to the respective second cutter holders about parallel second axes, and each of the second cutters has a second blade substantially parallel to the respective second axis.

Detailed features of the present cutting mechanism will become more apparent from the following detailed description and claims, and the accompanying drawings.

BRIEF DESCRIPTION OF THE DRAWINGS

Many aspects of the present cutting mechanism can be better understood with reference to the following drawing. The components in the drawing are not necessarily drawn to scale, the emphasis instead being placed upon clearly illustrating the principles of the present cutting mechanism. Moreover, in the drawings, like reference numerals designate corresponding parts throughout the several views, wherein.

DETAILED DESCRIPTION OF THE PREFERRED EMBODIMENTS

Figure 1:
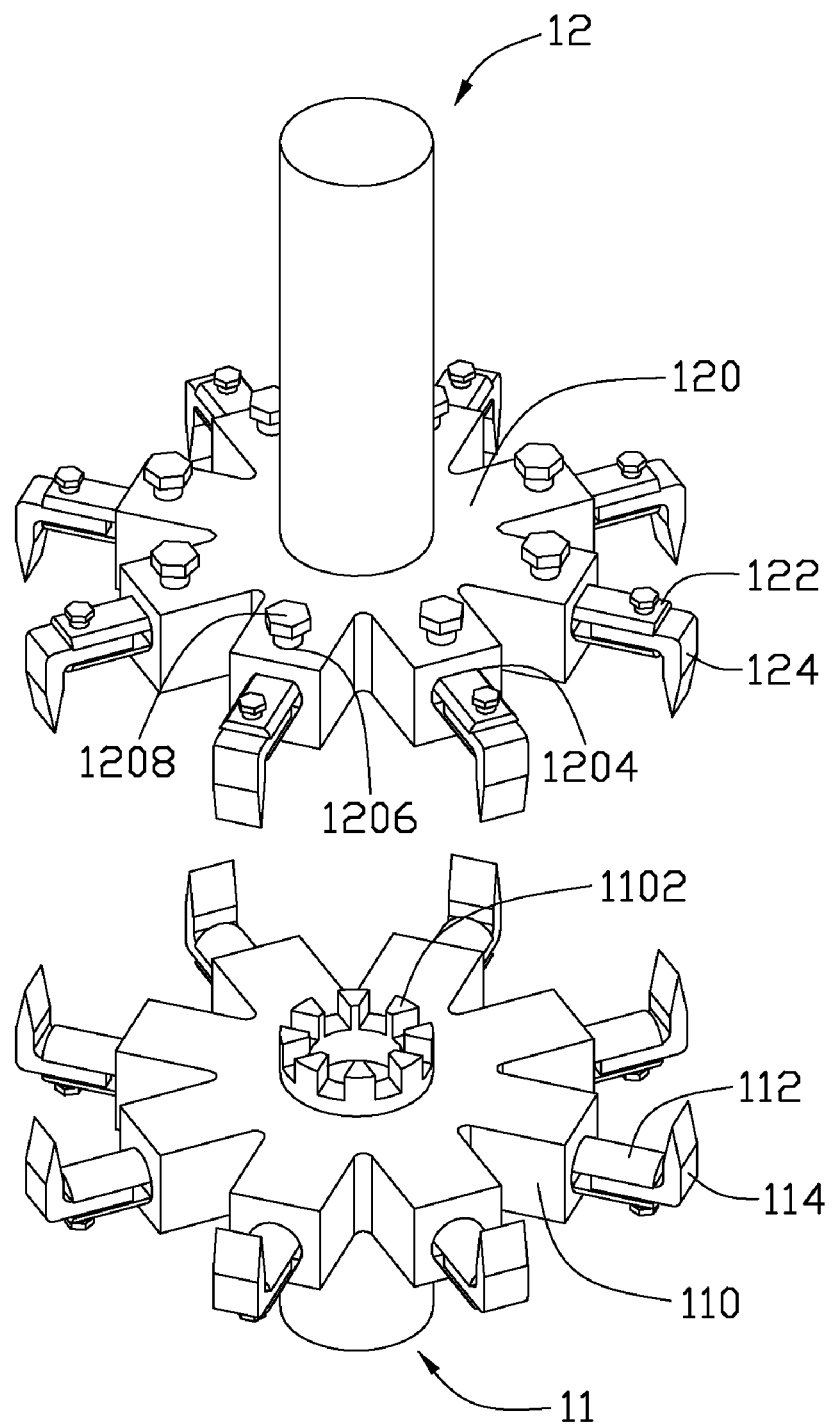
FIG. 1 is a schematic view of a cutting mechanism, according to an exemplary embodiment.

Reference will now be made to the drawing to describe the embodiments of the present cutting mechanism, in detail.

Referring to FIG. 1, a cutting mechanism 10, according to an exemplary embodiment, is shown. The cutting mechanism 10 includes a first main body 11 and a second main body 12.

Figure 2:
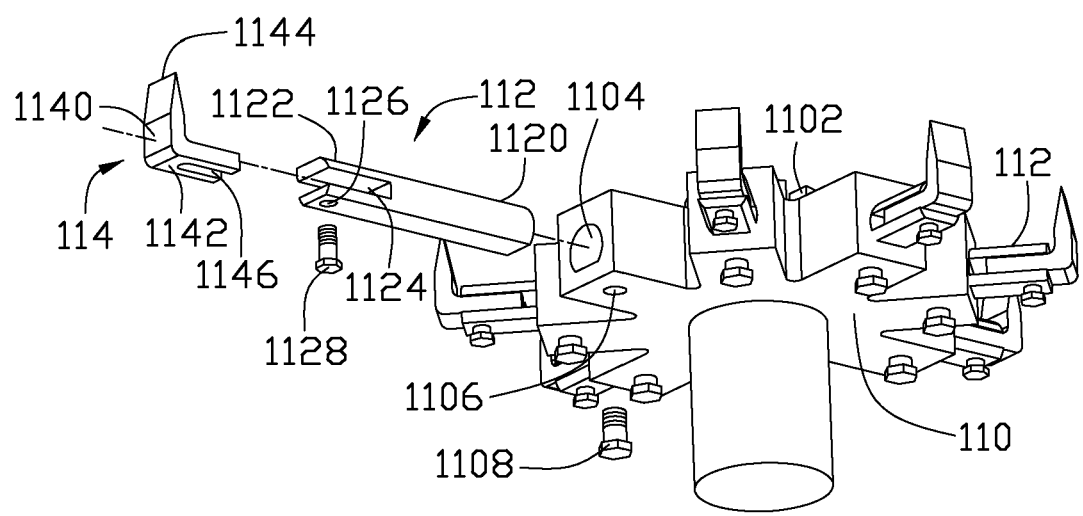
FIG. 2 is an exploded view of a first main body of the cutting mechanism illustrated in FIG. 1.

Referring to FIG. 2, the first main body 11 includes a base 110, a plurality of cutter holders 112 and a plurality of cutters 114 corresponding to the cutter holders 112. Each cutter 114 is assembled in the corresponding cutter holder 112. In this exemplary embodiment, the first main body 11 includes eight cutter holders 112 and eight cutters 114.

The base 110 includes a supporting portion 1102, a plurality of receiving recesses 1104, a plurality of positioning holes 1106 and a plurality of fasteners 1108. The supporting portion 1102 is configured for supporting semi-manufactured products formed by injection molding. The receiving recesses 1104 are respectively defined at side portions of the base 110 and configured for receiving end portions of the cutter holders 112 therein. The fasteners 1108 penetrate through the positioning holes 1106 and thereby fix the cutter holders 112 onto the base 110 respectively. The positioning holes 1106 communicate with the corresponding receiving recesses 1104 respectively. The positioning holes 1106 can be screw thread holes and the fasteners 1108 can be screws matching with the positioning holes 1106. The positioning holes 1106 can also be through holes with smooth inner walls, and the fasteners 1108 can be nuts and bolts matching with the nuts.

The cutter holders 112 extend radially and outwardly from the first base 110. Each of the cutter holders 112 includes a first end portion 1120 and a second end portion 1122. The second end portion 1122 includes a receiving slot 1124 and a pivot hole 1126. The receiving slot 1124 is configured for receiving the cutter 114. The pivot hole 1126 communicates with the receiving slot 1124. The pivot hole 1126 can be a screw thread hole. The pivot hole 1126 and a pivot member 1128 cooperatively pivot the cutter 114 with the second portion 1122. As such, the cutters 114 are detachably pivoted on the second end portions 1122 of the cutter holders 112. The pivot members 1128 can be screws engaging with the screw threads of pivot holes 1126. The pivot holes 1126 can also be through holes with smooth inner walls, and the pivot members 1128 can be nuts and bolts matching with each other.

The cutters 114 each includes a cutting portion 1140 and a pivot portion 1142. The cutting portion 1140 and the pivot portion 1142 are approximately perpendicular to each other. The cutting portion 1140 includes a blade 1144. The pivot portion 1142 includes a pivot slot 1146. The pivot portion 1142 is received in the receiving slot 1124 of the cutter holder 112. The pivot member 1128 penetrate through the pivot hole 1126 and the pivot slot 1146, thereby pivot and fix the pivot portion 1142 at the second end portion 1122 of the cutter holder 112.

Since the first end portion 1120 of the cutter holder 112 is received in the receiving recesse 1104 of the base 110 and fixed by engagement of the fastener 1108 in the positioning holes 1106, the cutter holder 112 can be moved back and forth when the fastener 1108 is loosened. Thereby, the position of the cutter holder 112 can be adjusted, and thereafter be fixed again by the fastener 1108.

Similarly, the cutter 114 can also be moved back and forth when the pivot member 1128 is loosened. Additionally, since the pivot portion 1142 of the cutter 114 is pivoted with the second end portion 1122 of the cutter holder 112 cooperatively by the pivot member 1128 and the pivot hole 1126, the cutter 114 can be rotated around the pivot member 1128 when the pivot member 1128 is loosened. Thereby, the cutter 114 can be adjusted to have a predetermined angle with the cutter holder 112, and thereafter be fixed again by the pivot member 1128.

Figure 3:
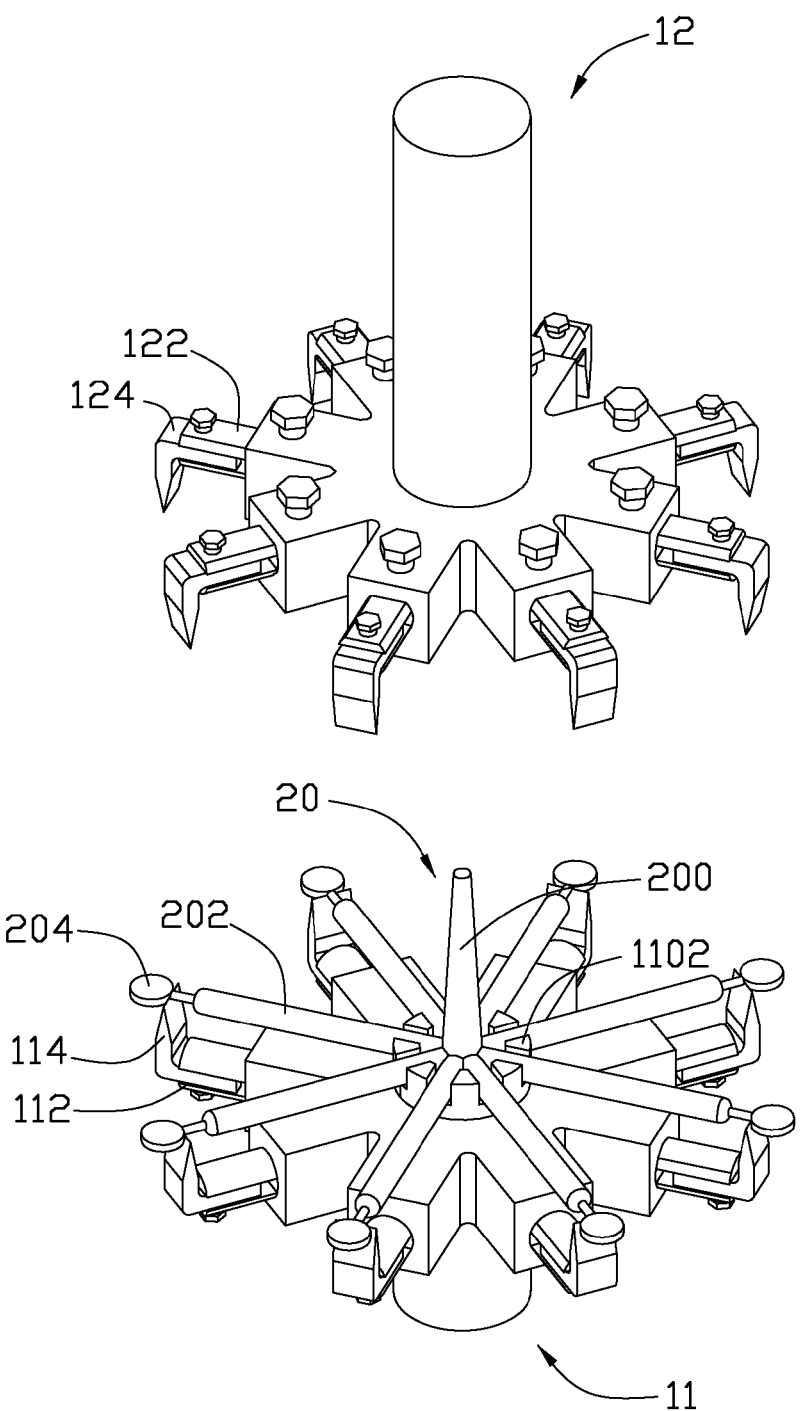
FIG. 3 is a schematic view of the cutting mechanism used to cut a semi-manufactured injection molding product with correctitude runners.
Figure 4:
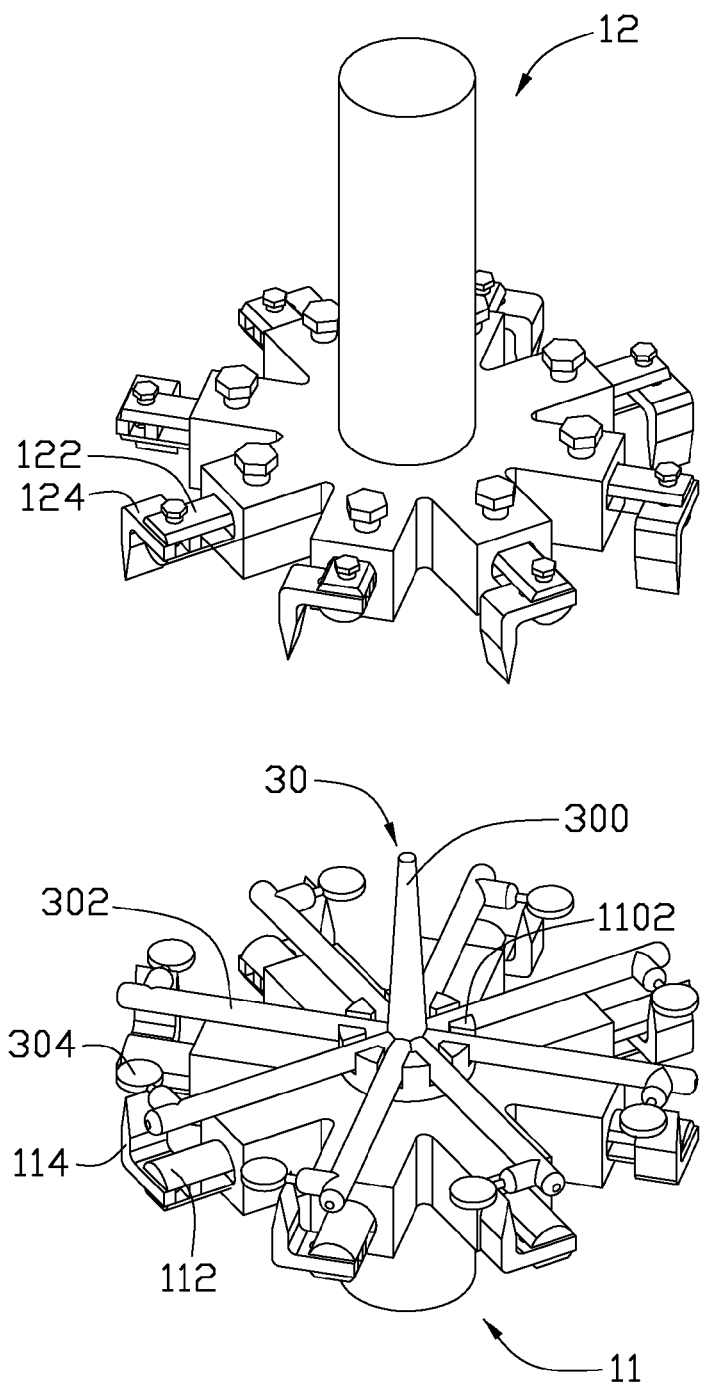
FIG. 4 is a schematic view of the cutting mechanism used to cut a semi-manufactured injection molding product with side runners.
Figure 5:
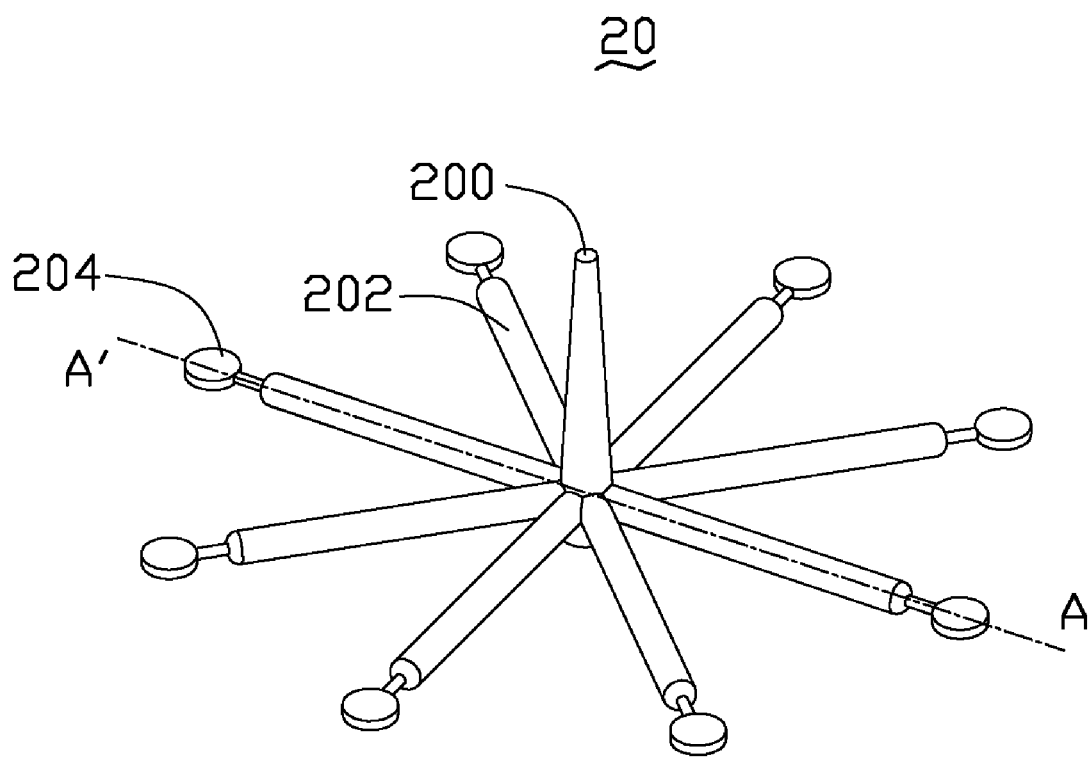
FIG. 5 is a schematic view of a typical semi-manufactured injection molding product with correctitude runners.
Figure 6:
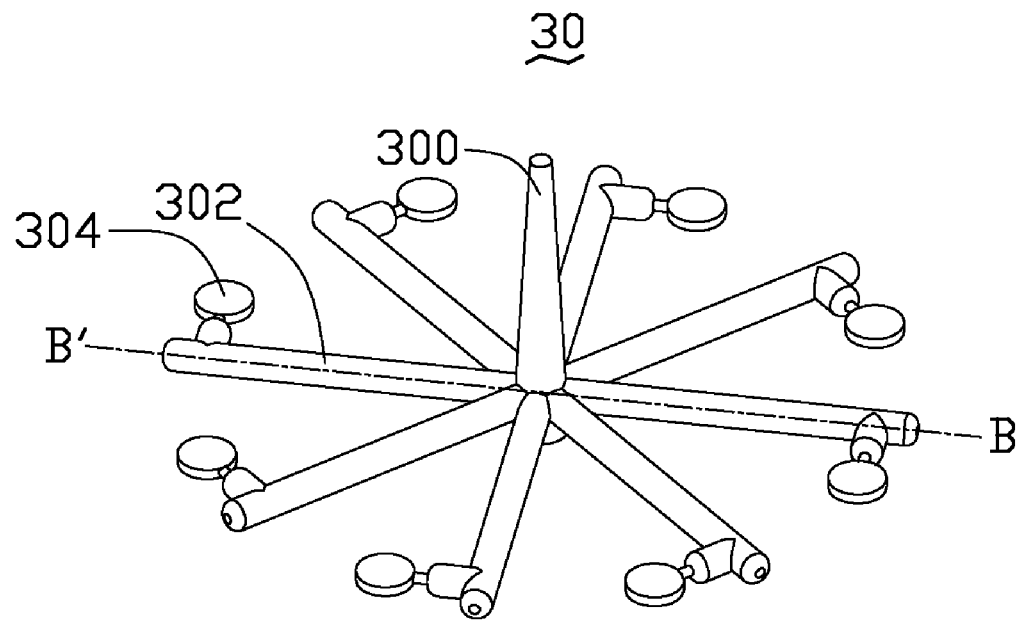
FIG. 6 is a schematic view of a typical semi-manufactured injection molding product with side runners.

The second main body 12 has a configuration approximately as same as the first main body 11. The second main body 12 includes a base 120, a plurality of cutter holders 122, and a plurality of cutters 124 arranged at end portions of the cutter holders 122. The base 120 includes a plurality of receiving recesses 1204, a plurality of positioning holes 1206 and a plurality of fasteners 1208. The cutter holders 122 are radially arranged around the first base 110. Each of the cutter holders 122 has an end portion received in the receiving recess 1204. In the present embodiment, there are eight cutters 124 detachably pivoted on the other end portions of the cutter holders 122. The difference between the first main body 11 and the second main body 12 is that, the second main body 12 does not include a base instead, it has a receiving hole/chamber configured for receiving sprue portions 200/or 300 (as shown in FIGS. 3 & 4). As such, the first and second main body 11, 12 can move relative to each other, thereby facilitating cutting function of the semi-manufactured products formed by injection molding.

Referring to FIG. 3, The semi-manufactured product 20 is disposed on the supporting portion 1102 of the first main body 11, with the runner portions 202 respectively arranged directly above the cutter holders 112. A plurality of lenses 204 are connected respectively connected to the runner portions 202. When the cutting mechanism 10 is used to cut the semi-manufactured product 20 having correctitude runners, the cutters 114 and 124 are respectively located at distal ends of the cutter holders 112 and 122 correspond with lenses 204. Thereby, the semi-manufactured product 20 will be cut as the first main body 11 and the second main body 12 moving towards each other.

Referring to FIG. 4, the semi-manufactured product 30 is disposed on the supporting portion 1102 of the first main body 11, with the runner portions 302 respectively arranged directly above the cutter holders 112. A plurality of lenses 304 are respectively connected to the runner portions 302. When the cutting mechanism 10 is used to cut the semi-manufactured product 30 having side runners, the pivot members 1128 are loosened, and thereby the cutters 114 can be rotated corresponds to the location of the semi-manufactured product 30 disposed on the supporting portion 1102 of the cutter holders 112. Thereafter, the pivot members 1128 will be fastened to fix the cutters 114 to the cutter holders 112. Then, the cutters 124 are rotated facing the cutters 114. The cutters 114,124 are respectively located on sides of the cutter holders 112, 122 and correspond with lenses 304 on sides of the runner portions of 302. Thereby, the semi-manufactured product 30 will be cut as the first main body 11 and the second main body 12 moving towards each other.

It is to be understood that, the number of cutter holders and cutters of the cutting mechanism 10 can also be one, two, three, four, six, or more and not limited to be eight. The cutter holders and the base can also be integrative. The distribution of the cutter holders is not limited to be radially arranged around the base, as long as it is the same with the distribution of the runner portions of the semi-manufactured products. The pivot slots of the cutters can also be replaced by through holes in the pivot portions of the cutters, the through holes can have smooth inner walls or be screw thread hole. Accordingly the pivot members can be nuts and bolts or screws matching the screw thread holes.

In sum, due to the cutting mechanism 10 being equipped with cutters 114, 124 detachably pivoted on end portions of the first cutter holders 112 and second cutter holders 122, thereby the cutters 114, 124 can be adjusted to have a predetermined orientation as same as that of the runner portions 200, 302, as such the cutting mechanism 10 is applicable for cutting semi-manufactured injection molding products having runners different orientations.

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. A cutting mechanism, comprising:
   a first main body comprising
      a first base,
      a plurality of first cutter holders, each of the first cutter holders comprising a first pivot hole and a first receiving slot, and
      a plurality of first cutters, the first cutters mounted on the respective first cutter holders, the first cutter holders movably engaged with the first base in a manner that the first cutters mounted thereon are adjustably movable toward and away from the first base, each of the first cutters having a first pivot portion rotatably engaged in the respective first receiving slot of the first cutter holders, the first cutters being rotatable relative to the respective first cutter holders about parallel first axes, each of the first cutters having a first blade substantially parallel to the respective first axis; and
   a second main body comprising
      a second base,
      a plurality of second cutter holders, each of the second cutter holders comprising a second pivot hole and a second receiving slot, and
      a plurality of second cutters, the second cutters mounted on the respective second cutter holders, the second cutter holders movably engaged with the second base in a manner that the second cutters mounted thereon are adjustably movable toward and away from the second base, each of the second cutters having a second pivot portion rotatably engaged in the respective second receiving slot of the second cutter holders, the second cutters being rotatable relative to the respective second cutter holders about parallel second axes, each of the second cutters having a second blade substantially parallel to the respective second axis, and whereby the first main body and the second main body move relative to each other to facilitate cutting.

2. The cutting mechanism according to claim 1, wherein the first cutter holders and the second cutter holders are detachably connected to the first base and the second base respectively.

3. The cutting mechanism according to claim 2, wherein the first base and the second base each comprise a plurality of positioning holes, a plurality of receiving recesses and a plurality of fasteners, the first cutting holders being fixed in the receiving recesses of the first base by engagement of the fasteners in the positioning holes, the second cutting holders being fixed in the receiving recesses of the second base by engagement of the fasteners in the positioning holes.

4. The cutting mechanism according to claim 3, wherein the positioning holes communicate with the receiving recesses.

5. The cutting mechanism according to claim 3, wherein the positioning holes are through holes penetrating the first base and the second base, and the fasteners include nuts and bolts.

6. The cutting mechanism according to claim 1, wherein the first pivot hole is in communication with the first receiving slot, the second pivot hole is in communication with the second receiving slot.

7. The cutting mechanism according to claim 1, wherein the first pivot holes are through holes that penetrate the first cutter holders, the second pivot holes are through holes that penetrate the second cutter holders.

* * * * *